US012679303B2

(12) United States Patent
Varcoe et al.

(10) Patent No.: US 12,679,303 B2
(45) Date of Patent: Jul. 14, 2026

(54) DIFFUSER FOR OCCUPANT RESTRAINT SYSTEM

(71) Applicant: ZF Passive Safety Systems US LLC, Washington, MI (US)

(72) Inventors: David Varcoe, Bruce Township, MI (US); Douglas Gould, Lake Orion, MI (US)

(73) Assignee: ZF Passive Safety Systems US LLC, Washington, MI (US)

( * ) Notice: Subject to any disclaimer, the term of this patent is extended or adjusted under 35 U.S.C. 154(b) by 0 days.

(21) Appl. No.: 18/986,883

(22) Filed: Dec. 19, 2024

(65) Prior Publication Data

US 2026/0175812 A1     Jun. 25, 2026

(51) Int. Cl.
  B60R 21/262    (2011.01)
  B60R 21/217    (2011.01)
  B60R 21/232    (2011.01)
(52) U.S. Cl.
  CPC ........ B60R 21/262 (2013.01); B60R 21/2171 (2013.01); B60R 21/232 (2013.01)
(58) Field of Classification Search
  CPC . B60R 21/213; B60R 21/214; B60R 21/2171; B60R 21/2176; B60R 21/232; B60R 21/262
  See application file for complete search history.

(56) References Cited

U.S. PATENT DOCUMENTS

| | | | | |
|---|---|---|---|---|
| 5,536,041 | A | * | 7/1996 | Acker ............... B60R 21/23138 |
| | | | | 280/740 |
| 5,611,563 | A | * | 3/1997 | Olson ................. B60R 21/2171 |
| | | | | 280/741 |
| 5,918,898 | A | * | 7/1999 | Wallner ................ B60R 21/261 |
| | | | | 280/740 |
| 7,699,340 | B2 | * | 4/2010 | Okuhara ............. B60R 21/2171 |
| | | | | 280/728.2 |
| 7,938,436 | B2 | * | 5/2011 | Lunt ................... B60R 21/2171 |
| | | | | 280/740 |
| 8,613,468 | B2 | * | 12/2013 | Maruyama ............ B60R 21/261 |
| | | | | 280/730.2 |
| 8,684,399 | B2 | * | 4/2014 | Honda ................. B60R 21/263 |
| | | | | 280/728.2 |
| 9,511,736 | B2 | * | 12/2016 | Kojima ............... B60R 21/2171 |
| 10,391,969 | B2 | * | 8/2019 | Otsuka ................. B32B 15/082 |
| 10,632,953 | B2 | * | 4/2020 | Shigemura ............ B60R 21/206 |
| 12,311,863 | B2 | * | 5/2025 | Bernhard ............. B60R 21/206 |
| 2023/0060876 | A1 | | 3/2023 | Gould et al. |

* cited by examiner

*Primary Examiner* — Laura Freedman
(74) *Attorney, Agent, or Firm* — Tarolli, Sundheim, Covell & Tummino LLP

(57) ABSTRACT

A diffuser for an airbag module having a housing enclosing an inflator and an airbag for helping to protect the occupant of a vehicle includes a base extending longitudinally from a first end to a second end. The base includes at least one first opening for receiving at least one first fastener for securing the inflator to the housing. Sidewalls extend from opposite sides of the base to define a passage for receiving the inflator. An extension projects longitudinally beyond the passage and includes a second opening for receiving a second fastener for securing the extension to the housing.

18 Claims, 10 Drawing Sheets

DIFFUSER FOR OCCUPANT RESTRAINT SYSTEM

TECHNICAL FIELD

The present invention relates generally to vehicle airbags and, in particular, relates to a tubular diffuser for an airbag module.

BACKGROUND

It is known to provide an inflator for inflating an inflatable vehicle occupant protection device, such as an airbag. Inflators can be several types, such as solid propellant, stored gas, or hybrid. Solid propellant inflators include a volume of a solid propellant, typically in the form of tablets, that are pyrotechnic in nature and generate inflation fluid when ignited in response to inflator actuation. Stored gas inflators store a pressurized volume of inflation fluid that is released in response to inflator actuation. Hybrid inflators combine these technologies, including both pressurized inflation fluid and a volume of solid propellant gas generating material.

Passenger side curtain airbags are stored in a deflated condition in a housing that is mounted along the roof. An airbag door is connectable with the housing and/or roof to help enclose and conceal the airbag in a stored condition. Upon deployment of the passenger airbag, the airbag door opens to permit the airbag to move downward to an inflated condition. The airbag door opens as a result of forces exerted on the door by the inflating airbag.

Curtain airbag (CAB) inflators can be configured to be positioned inside the bag, or to connect to a mouth portion of the airbag, which is typically in the form of a tubular sleeve. The CAB inflator is typically provided with a diffuser that serves the dual purpose of mounting the curtain airbag/inflator to the roof while helping to distribute inflation gases to the airbag interior in a desired manner.

SUMMARY

According to one aspect, a diffuser for an airbag module having a housing enclosing an inflator and an airbag for helping to protect the occupant of a vehicle includes a base extending longitudinally from a first end to a second end. The base includes at least one first opening for receiving at least one first fastener for securing the inflator to the housing. Sidewalls extend from opposite sides of the base to define a passage for receiving the inflator. An extension projects longitudinally beyond the passage and includes a second opening for receiving a second fastener for securing the extension to the housing.

According to another aspect, an assembly for an airbag module having a housing enclosing an airbag for helping to protect the occupant of a vehicle includes an inflator having first and second nozzles for releasing inflation fluid into the airbag. A diffuser for directing inflation fluid from the nozzles into the airbag includes a base extending longitudinally from a first end to a second end and at least one first opening for receiving at least one first fastener for securing the inflator to the housing. Sidewalls extend from opposite sides of the base to define a passage for receiving the inflator. An extension projects longitudinally beyond the passage and includes a second opening for receiving a second fastener for securing the extension to the housing.

According to another aspect, taken alone or in combination with any other aspect, the sidewalls are curved for mirroring the exterior of the inflator.

According to another aspect, taken alone or in combination with any other aspect, a narrowing throat connects the base to the extension According to another aspect, taken alone or in combination with any other aspect, the second opening is longitudinally offset from the sidewalls.

According to another aspect, taken alone or in combination with any other aspect, the first and second openings are longitudinally aligned with one another.

According to another aspect, taken alone or in combination with any other aspect, the first and second openings are positioned on opposite ends of the base.

According to another aspect, taken alone or in combination with any other aspect, the at least one first fastener is fixed to the inflator and the second fastener is spaced from the inflator.

According to another aspect, taken alone or in combination with any other aspect, the at least one first opening and the second opening are positioned on opposite longitudinal sides of the nozzles.

Other objects and advantages and a fuller understanding of the invention will be had from the following detailed description and the accompanying drawings.

DETAILED DESCRIPTION

Figure 1:
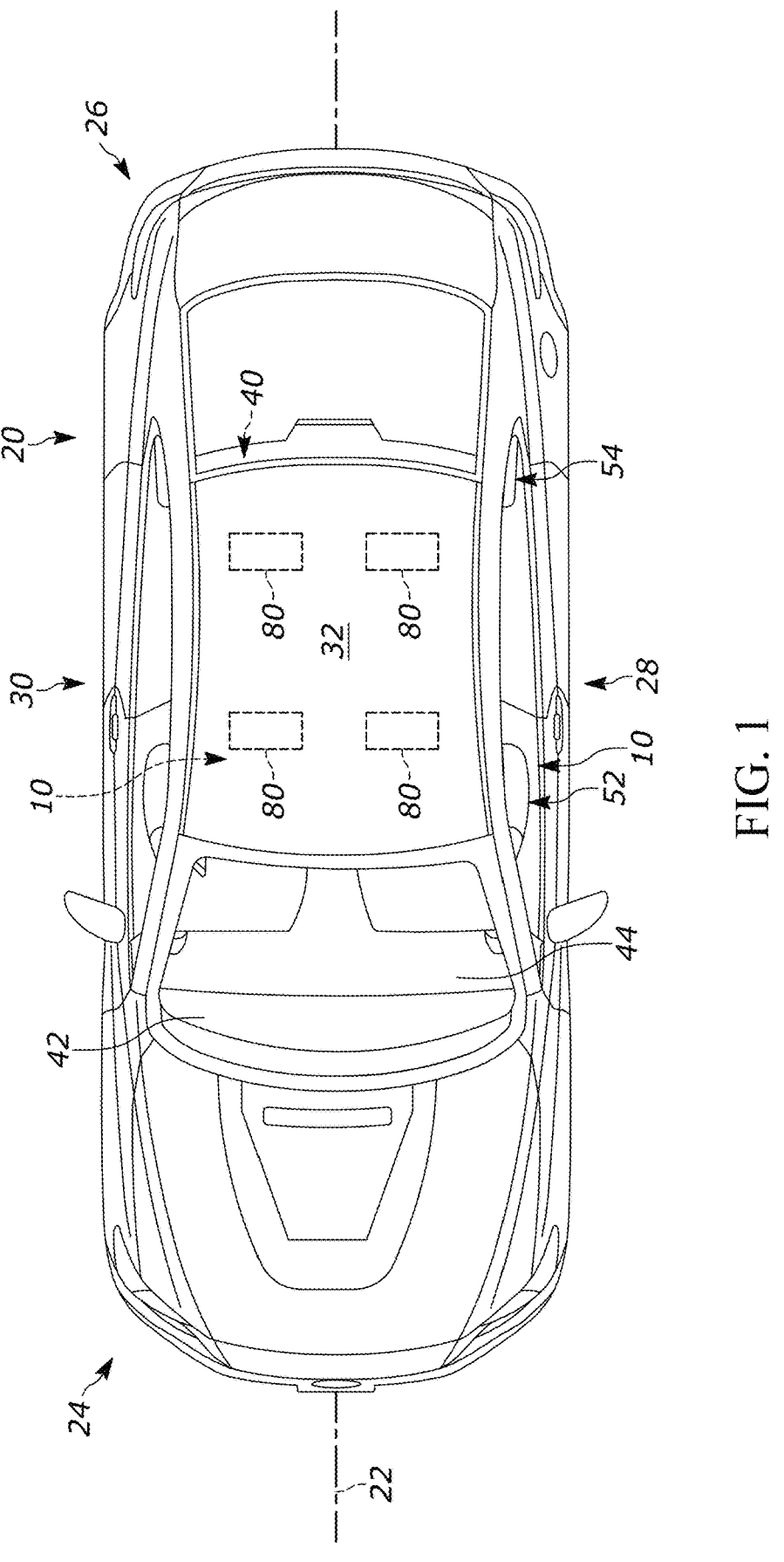
FIG. 1 is a top view of a vehicle including an example occupant restraint system including roof-mounted airbags.
Figure 2:
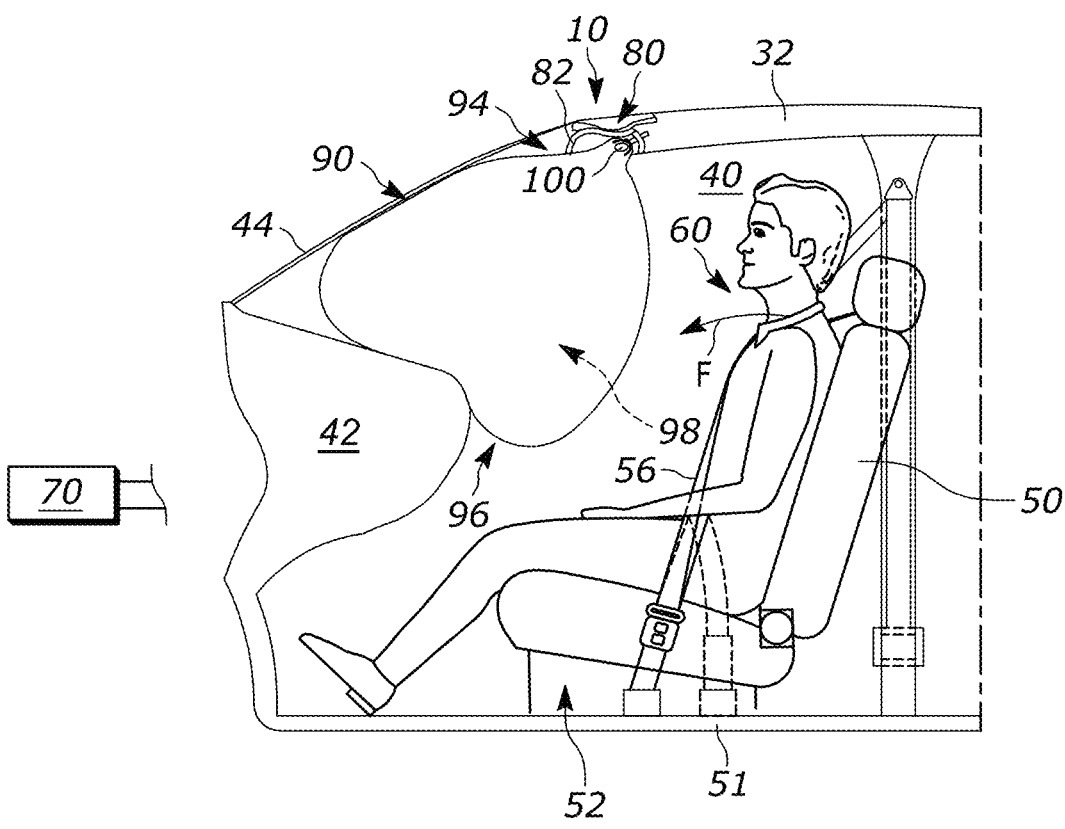
FIG. 2 is a schematic illustration of a cabin of the vehicle with the airbag in a deployed condition.

The present invention relates generally to vehicle airbags and, in particular, relates to a tubular diffuser for an airbag module. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22.

The vehicle 20 includes a roof 32 that cooperates with the sides 28, 30 to define an interior cabin 40. An instrument panel 42 further defines the cabin 40 and is presented facing towards the second end 26 of the vehicle 20. A windshield or windscreen 44 can be located at the first end 24 and extends downward from the roof 32 to the instrument panel 42.

Alternatively, the vehicle 20 can be an autonomous vehicle, in which case the cabin 40 can be without operator controls, such as a steering wheel, pedals, instrumentation, center console, etc. (not shown). Accordingly, the instrument panel typically provided in driven vehicles can be removed altogether in order to maximize the space in the cabin 40.

Seats 50 are positioned in the cabin 40 and secured to a floor 51 of the vehicle 20. The seats 50 can be oriented in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

For the conventional, forward-facing seating arrangement of FIG. 2, in the event of a frontal crash, the occupants 60 of both the front and rear rows 52, 54 can be restrained by their respective seatbelts 56 (as shown) or unbelted (not shown). Additional restraints are, however, desirable for both head and neck support as well as support for the upper torso. This additional protection is typically provided, at least for the front row 52 occupants 60, at least in part by roof-mounted restraints.

To this end, the occupant restraint system 10 includes at least one vehicle occupant protection device in the form of an inflatable airbag 90 housed/concealed in the roof 32 of the vehicle 20. More specifically, the airbag 90 is stored in a module 80 provided in the roof 32 and having a housing 82. The airbag 90 is at least one of rolled and folded before being placed in the housing 82 of the module 80.

An inflator 100 is also positioned in each module 80 for providing inflation fluid to each airbag 90. The inflators 100 are operatively connected (e.g., by wires) to an airbag controller 70 (see FIG. 2) that includes or communicates with one or more crash sensors (not shown). The airbag controller 70 is operative to determine the occurrence of a crash event and to actuate the inflators 100 in a known manner to inflate the airbags 90. The inflators 100 can be of any known type, such as stored gas, solid propellant, augmented or hybrid.

The airbag 90 can be constructed of any suitable material, such as nylon (e.g., woven nylon 6-6 yarns), and may be constructed in any suitable manner. For example, the airbag 90 may include one or more pieces or panels of material. If more than one piece or panel is used, the pieces or panels can be interconnected by known means, such as stitching, ultrasonic welding, heat bonding, or adhesives, to form the airbag 90. The airbag 90 can be uncoated, coated with a material, such as a gas impermeable urethane, or laminated with a material, such as a gas impermeable film. The airbag 90 can therefore have a gas-tight or substantially gas-tight construction. Those skilled in the art will appreciate that alternative materials, such as polyester yarn, and alternatives coatings, such as silicone, may also be used to construct the airbag 90.

The occupant restraint system 10 can include multiple airbags 90 provided on the roof 32 adjacent each seat 50 in each row 52, 54. In other words, each seat 50 in the vehicle 20 can have an individual roof module 80 (with corresponding airbag 90 and inflator 100) associated therewith. Alternatively, a single roof module 80 and, thus, a single airbag 90 and inflator 100 can be associated with an entire row 52 or 54 of seats 50 (not shown).

Regardless, in FIG. 2, each airbag 90 is positioned in the roof 32 in front of the associated seat 50 (i.e., forward of the seats 50 in the front row 52 and forward of the seats in the rear row 54). Although the airbags 90 within the roof 32 are identical for each row 52, 54 provided in the vehicle 20, the construction and operation of only the airbag associated with a single seat 50 in the front row 52 is discussed for brevity.

Mounting the airbags 90 in the area of the roof 32 allows for rapid deployment into a position extending laterally across the width (the lateral direction of the vehicle 20) of the seat 50 in front of the occupant 60. The airbags 90 can be configured to deploy from their mounting locations inboard and/or outboard, depending on factors such as the architecture of the vehicle 20 and the resulting space through which the airbags can deploy. In any case, mounting the airbags 90 in the area of the roof 32 is also convenient because the airbags can be positioned in a location with a desired proximity to the occupant(s) 60 they are intended to help protect. This can help reduce the necessary inflatable volume of the airbags 90 and can also help provide a desired deployment time without requiring an excessively high-volume inflator.

As shown in FIG. 2, upon sensing the occurrence of an event for which inflation of the airbags 90 is desired, such as a vehicle collision, the controller 70 provides signals to the inflators 100. Upon receiving the signals from the controller 70, the inflator 100 is actuated and provides inflation fluid to the inflatable volume 98 of the airbag 90 in a known manner. The inflating airbag 90 exerts a force on the housing 82 (or door associated therewith), which causes the housing and the roof 32 to open (e.g., via tear scam or door).

This releases the airbag 90 to inflate and deploy from its stored condition in the module 80 in the roof 32 to a deployed condition extending into the cabin 40 forward of and aligned with (e.g., in the forward-rearward direction of the vehicle 20) the seat 50 in the front row 52. In particular, the airbag 90 inflates in the lateral direction of the vehicle 20 across the width of the seat 50 so as to be aligned with the occupant 60 in the seat. The airbag 90, while inflated, helps protect the head and upper torso of the vehicle occupant 60 in the front row 52 by absorbing the impact of the occupant.

In particular, and referring to FIG. 2, the airbag 90 inflates from its stored location in the roof 32 to its deployed condition. The airbag 90, when deployed, extends from an upper end 94 to lower end 96 and defines the inflatable volume 98. The upper end 94 is connected to the vehicle 20 and fluidly connected to the inflator 100. The lower end 96 is positioned adjacent to the occupant 60 in the front row 52.

In its deployed condition, the airbag 90 is configured to extend across the width of the seat 50 in front of the occupant 60 and downward from the roof 32 to a position sufficient to receive and help protect the occupant's upper torso. In one example, the lower end 94 extends rearward and downward away from the roof 32 generally towards the occupant's upper torso but terminates prior to reaching the lower torso. In the deployed condition, the airbag 90 is positioned between the occupant 60 and the instrument panel 42 and windshield 44. In this manner, the instrument panel 42 and/or windshield 44 and/or roof 32 can act as a reaction surface(s) for the deployed airbag 90 to thereby help prevent injuries to the occupant 60.

The extent of the airbag 90 deployment vertically and/or horizontally (as shown in FIG. 2) can be adjusted in order to adjust the coverage of the airbag. To this end, the airbag 90 can be configured to extend further inboard and/or outboard in order to help protect the occupant 60 in the event of an oblique or offset collision. The inflation depth of the airbag 90 (in the direction of the centerline 22) can also be adjusted.

When the occupant 60 is unbelted, a frontal crash resulting in forward occupant movement causes the occupant to bend at the waist and follow an angled or arcuate path toward the airbag 90, as indicated generally by the arrow F in FIG. 2. Once the moving occupant 60 engages/penetrates the airbag 90, the airbag is urged to move in the direction F towards a combination of, in this example, the instrument panel 42 and the windshield 44, which helps provide a reaction surface to the penetrating occupant, thereby helping to prevent collision between the occupant and the windshield/instrument panel.

With this in mind, it is desirable to construct the module 82 such that the airbag deploys to its intended location between the occupant and the instrument panel 42 to maximize its efficacy. To this end, the airbag module 80 of the present invention is specifically tailored to help reliably deploy the airbag 90 by reducing or eliminating unwanted loading on the airbag module 82.

Figure 3A:
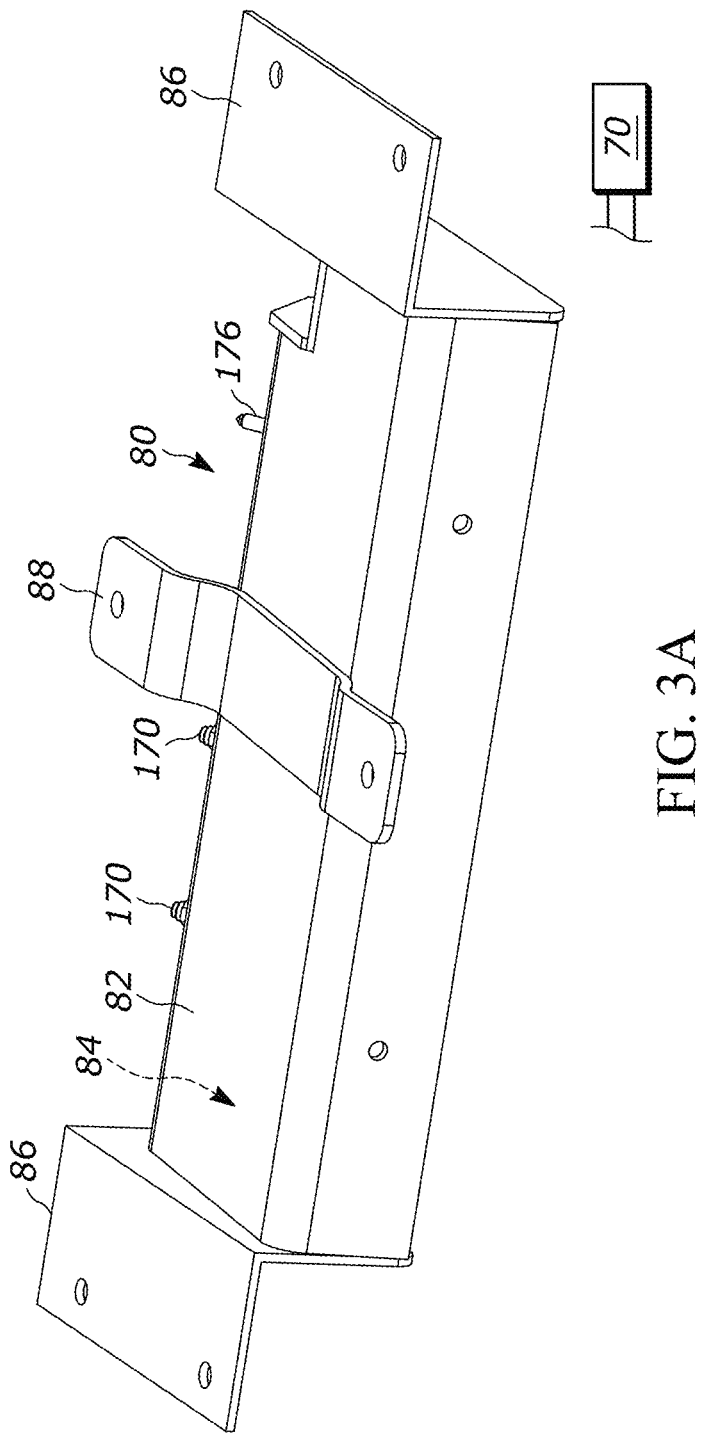
FIG. 3A is a top view of an example airbag module for the airbag.
Figure 3B:
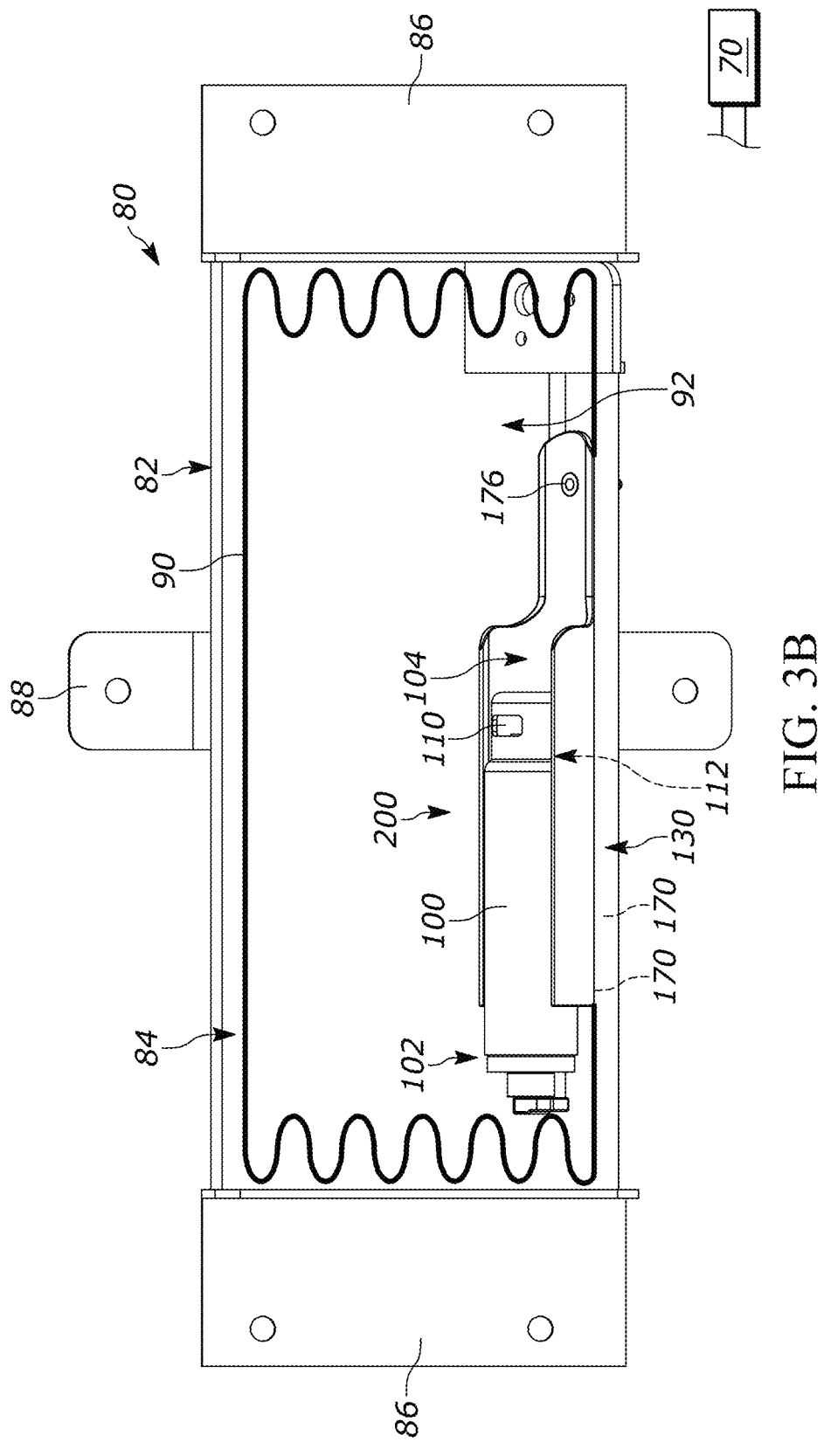
FIG. 3B is a bottom view of the airbag module.

Turning to FIGS. 3A-3C, the airbag module 80 includes the housing 82 defining an interior space 84. The housing 80 is made from a durable material, such as metal or plastic. First and second mounting brackets 86, 88 extend from or are secured to the housing 82 for helping to mount the housing to the roof 32 with fasteners (not shown).

The inflator 100 extends from a first end 102 to a second end 104. The first end 102 is electrically connected to the controller 70 for controlling actuation of the inflator. The second end 104 includes at least one nozzle for releasing ignited propellant/inflation fluid into the airbag. As shown, the second end 104 of the inflator 100 includes a pair of nozzles 110, 112 diametrically opposed from one another about the length of the inflator.

Figure 4A:
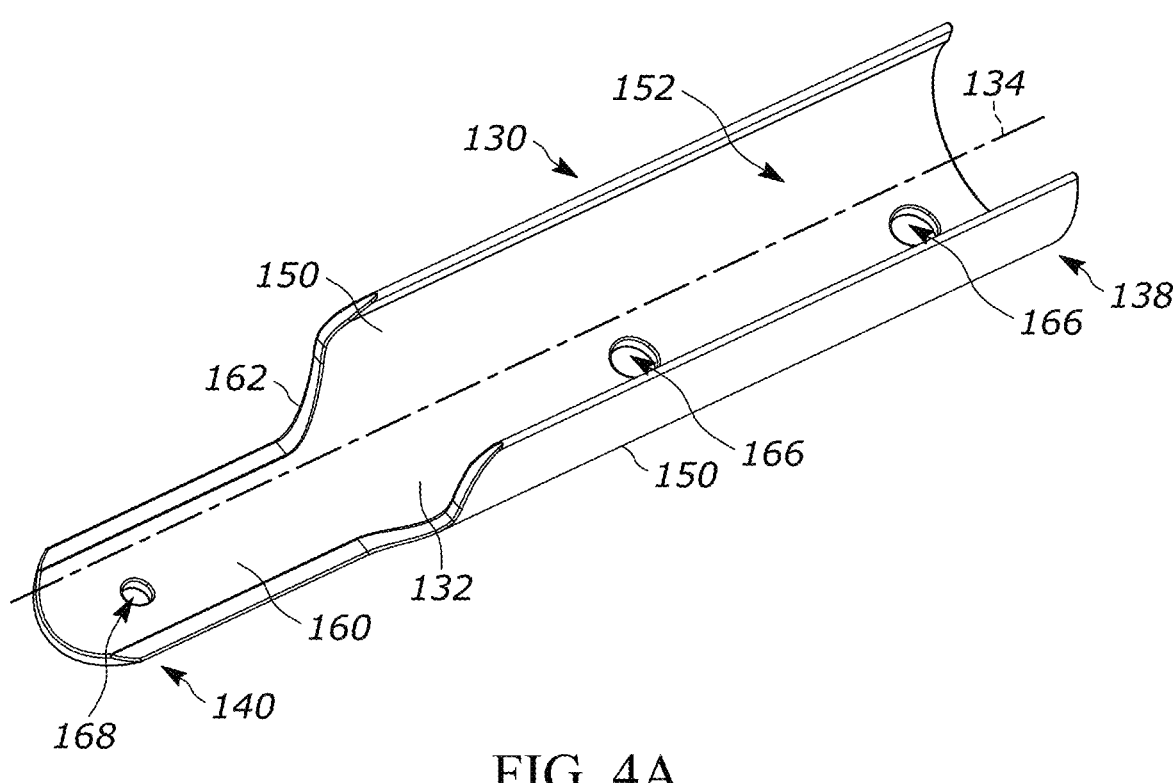
FIG. 4A is a schematic illustration of a diffuser for the airbag module.
Figure 4B:
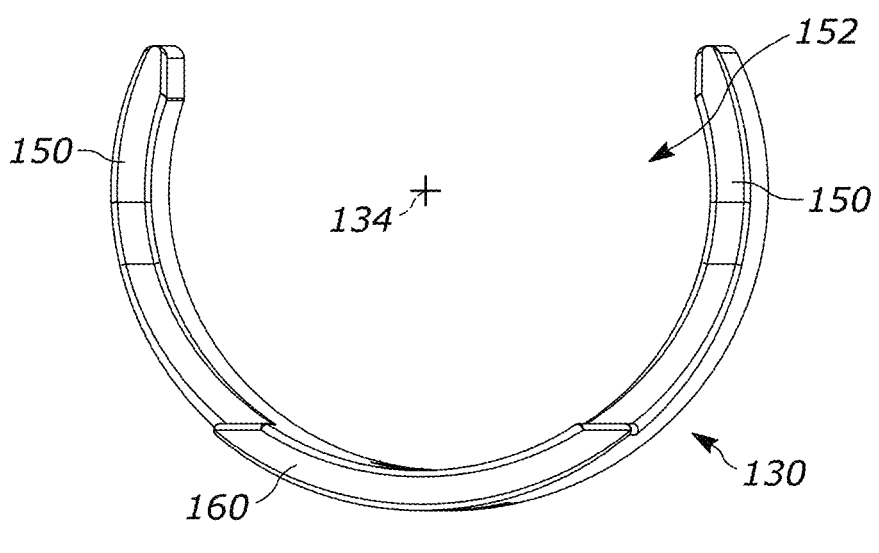
FIG. 4B is an end view of the diffuser.
Figure 4C:
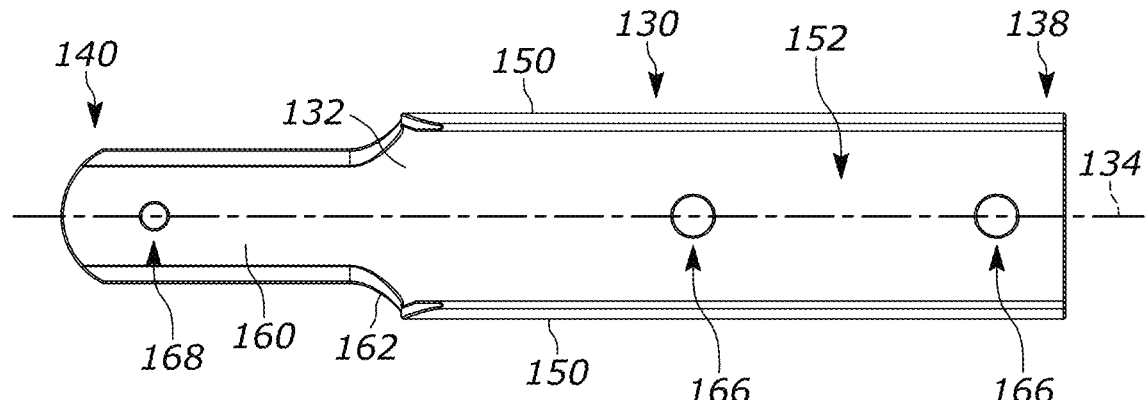
FIG. 4C is a top view of the diffuser.

A tubular diffuser 130 (FIGS. 4A-4C) is provided for both mounting the inflator 100 and airbag 90 to the housing 82 and helping to direct inflation fluid from the actuated inflator to the inflatable volume 98. To this end, the diffuser 130 includes a base 132 extending along a centerline 134 from a first end 138 to a second end 140. Sidewalls 150 extend upwards (as shown) from opposite sides of the base 132. The sidewalls 150 cooperate with the base 132 to define a passage 152 for receiving the inflator 100. As shown, the sidewalls 150 are curved to mimic the outer contour of the inflator 100. It will be appreciated, however, that the sidewalls 150 could have other shapes, such as rectangular, square, oval, etc.

The sidewalls 150 extend longitudinally from the first end 138 towards the second end 140 but terminate prior to reaching the longitudinal extent of the second end. Due to this configuration, the base 132 defines an extension or projection 160 projecting longitudinally beyond the sidewalls 150 and therefore beyond the passage 152. In one example, the portion of the base 132 defining the extension 160 is narrower than the remainder of the base relative to the centerline 134. In this configuration, the base 132 narrows at a throat or curved portion 162 extending from the sidewalls 150 to the extension 160.

Openings are provided along the length of the base 132. In particular, a pair of first openings 166 extends through the base 132 and are positioned longitudinally between the sidewalls 150. A second opening 168 extends through the extension 160. All three openings 166, 168 are aligned along the centerline 134. More or fewer openings 166 and/or more or fewer openings 168 can be provided in the base 132. As will be discussed, the openings 166, 168 all receive fasteners for securing the inflator 100 and diffuser 130 to the module housing 82.

Figure 5A:
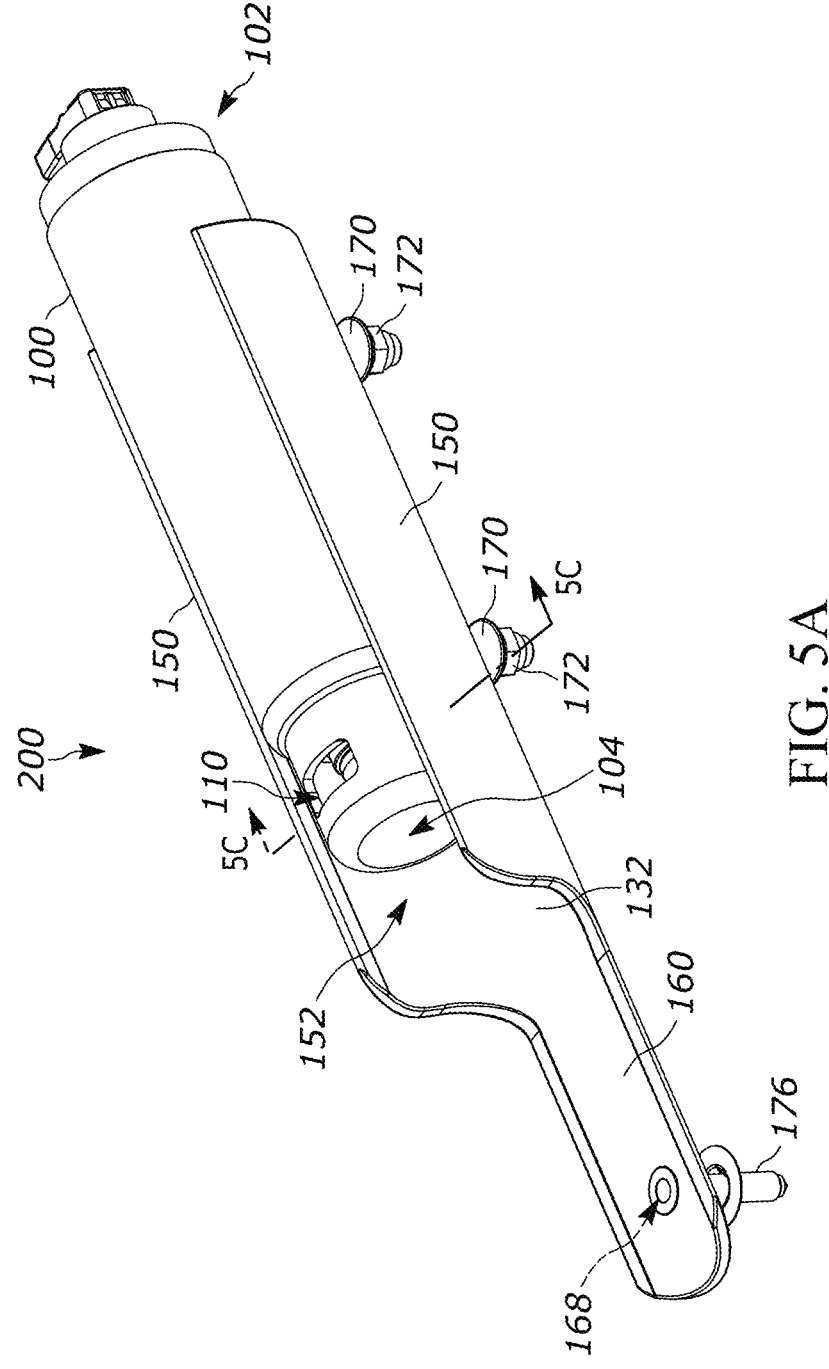
FIG. 5A is a schematic illustration of the diffuser secured to an inflator to form an assembly.
Figure 5B:
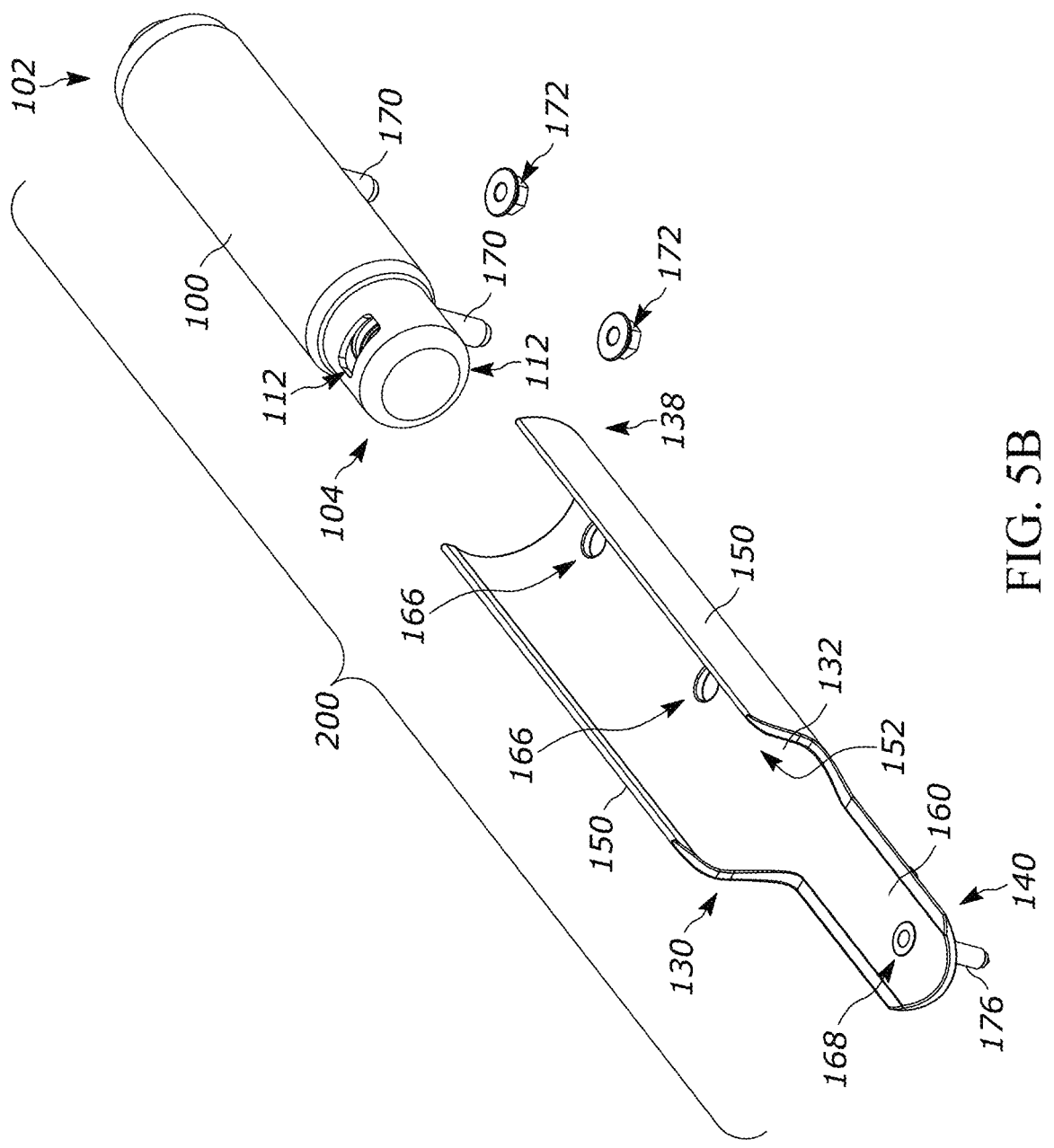
FIG. 5B is an exploded view of FIG. 5A.
Figure 5C:
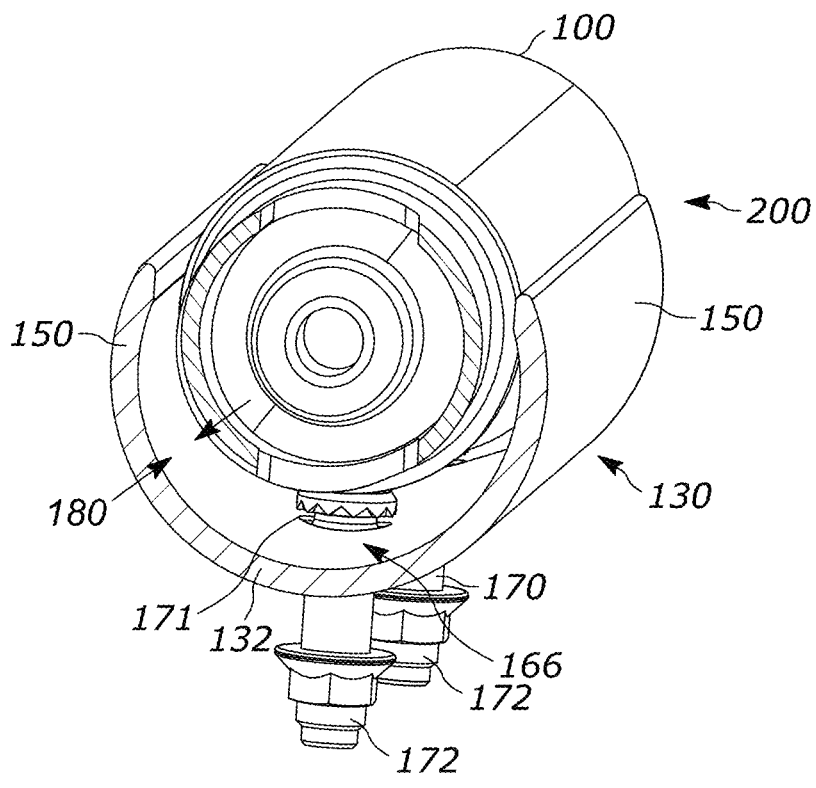
FIG. 5C is a section view taken along line 5C-5C of FIG. 5A.

To this end, a subassembly 200 of the inflator 100 and diffuser 130 is illustrated in FIGS. 5A-5C. Fasteners 170 are secured to and extend from the exterior of the inflator 100. The fasteners 170 can be, for example, welded, pressed or friction welded to the inflator 100. In any case, the fasteners 170 extend parallel to one another and are aligned with one another along the length of the inflator 100.

The inflator 100 is positioned within the passage 152 between the sidewalls 150 such that the fasteners 170 extend through the first openings 166. In this orientation, the first end 102 of the inflator 100 can extend axially beyond the first end 138 of the diffuser 130 (as shown) or be positioned entirely between the sidewalls 150 (not shown).

The inflator 100 is also rotationally oriented along its long axis such that the first nozzle 110 is exposed between the sidewalls 150 (upwards as shown) and faces away from the diffuser 130. In other words, the second end 104 of the inflator 100 is longitudinally spaced from the extension 160 and retained entirely in the passage 152. The second nozzle 112 faces the base 132 of the diffuser 130 at the centerline 134. A radial gap or space 180 (FIG. 5C) is defined between the periphery of the inflator 100 and the sidewalls 150 and extends around to the base 132 so as to substantially encircle the inflator 100. In this manner, the sidewalls 150 are concentric with the inflator 100. When the inflator 100 is secured to the diffuser 130, the nozzles 110, 112 are positioned at or adjacent to the longitudinal center of the diffuser, i.e., halfway or about halfway between the longitudinal extent of the first end 138 and the longitudinal extent of the extension 160.

Returning to FIGS. 3A-3B, when the module 80 is assembled, the assembly 200 extends along/parallel to the length of the housing 82. The threaded fasteners 170 extend through the first openings 166 and corresponding openings (not shown) in the housing 82. Nuts 172 are then used to secure those portions of the base 132 to the housing 82. An additional fastener 176 extends through the second opening 168 in the extension 160 and through a corresponding opening (not shown) in the housing. In one example, the fastener 176 is a push-in type fastener. It will be appreciated that any of the fasteners 170, 176 can have alternative, known fastener configurations. In any case, in this example the assembly 200 is secured to the housing 82 at multiple locations along the length of the diffuser 130.

Advantageously, as will be discussed, the fasteners 170 and the fastener 176 are positioned on opposite longitudinal sides from one another relative to the nozzles 110, 112. A portion of the rolled and/or folded airbag 90 is positioned between the assembly 200 and the housing 82. The fasteners 170, 176 cooperate to pinch/clamp the airbag 90 between the base 132 of the diffuser 130 and the housing 82 while simultaneously clamping the base to the housing. Consequently, both of the nozzles 110, 112 are positioned within the inflatable volume 98 of the airbag 90.

Figure 6:
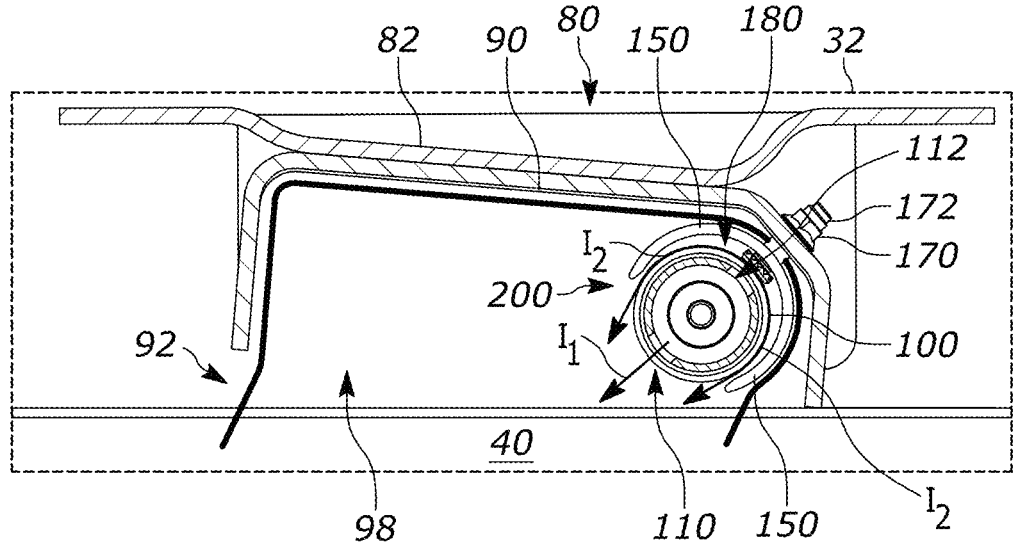
FIG. 6 is a side view of the airbag module during inflation and deployment of the airbag.
Figure 7:
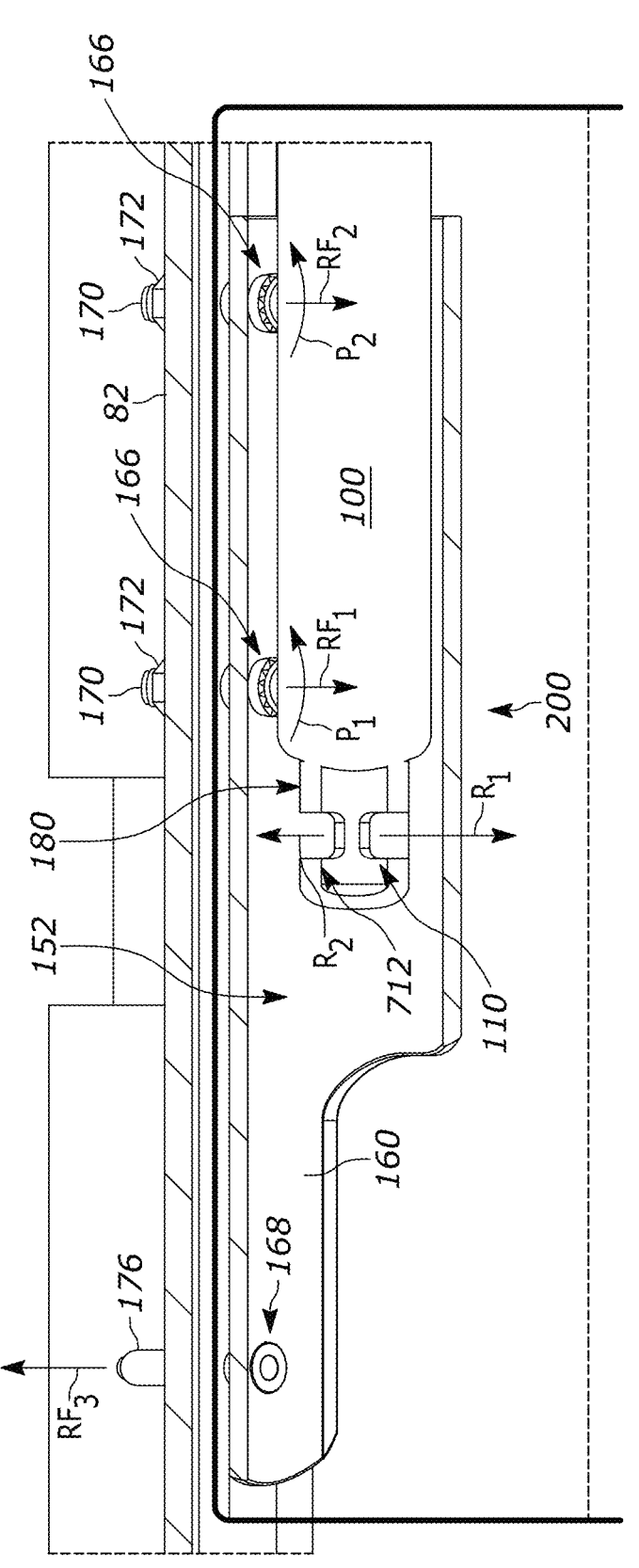
FIG. 7 is a schematic illustration of forces acting on the inflator and diffuser during inflation and deployment of the airbag.

Turning to FIGS. 6-7, upon actuation of the inflator 100 in response to a vehicle collision, the propellant(s) are ignited within the inflator in a known manner. This releases inflation fluid through both nozzles 110, 112 in the general directions $I_1$, $I_2$. More specifically, the inflation fluid flows from the nozzle 110 in the direction $I_1$, and is therefore unobstructed by the diffuser 130, thereby allowing inflation fluid to pass directly from the inflator 100 to the inflatable volume 98 of the airbag 90. On the other hand, the nozzle 112 faces/confronts the base 132 of the diffuser 130. Consequently, the inflation fluid exiting the nozzle 112 flows in the direction $I_2$ into contact with the base 132 before flowing through the radial gap 180 to both sides of the inflator. This inflation fluid then passes between the sidewalls 150 to exit the diffuser 130. Due to these differing flowpaths $I_1$, $I_2$, there are net reaction forces generated at the fasteners 170 in the directions shown at $RF_1$, $RF_2$.

To this end, since the nozzle 112 faces the base 132 of the diffuser 130, the reaction forces $RF_1$, $RF_2$ impinge on the bottom-facing surface of the inflator 100—attempting to lift the inflator off the diffuser 130 about the first fasteners 170 in respective pivoting manners indicated generally at $P_1$, $P_2$. Advantageously, these reaction forces $RF_1$, $RF_2$ are counterbalanced by reaction forces $RF_3$ at the fastener 176 connecting the diffuser 130 to the housing 82. In other words, due to the presence of the fastening points 170, 176 between the diffuser 130 and the housing 80 on opposite sides of the nozzles 110, 112, the reaction forces $RF_1$, $RF_2$ generated by inflation fluid exiting the nozzles are substantially counterbalanced/offset by the reaction forces $RF_3$. This counterbalance is sufficient to maintain the inflator 100 and diffuser 130 in the conditions shown during inflation and deployment of the airbag 90, i.e., the inflator and diffuser are substantially force-neutral during operation. Consequently, the inflation fluid fills the inflatable volume 98 to deploy the airbag 90 out of the module 80 and downward from the roof 32 towards the occupant 60 in the desired manner as shown in FIG. 2.

It is clear from the above that the diffuser of the present invention is advantageous in that it helps to generate reaction forces for counterbalancing reaction forces that arise during use of diametrically opposed inflator nozzles. Due to requirements for shipping pyrotechnic devices, such as airbag inflators, it may be more desirable to ship inflators that include diametrically opposed nozzles—as opposed to an inflator with a single nozzle. The rear, diffuser facing nozzle, however, is frequently capped or plugged during operation because of the reaction forces mentioned above. These reaction forces, when experienced by current diffusers, can create movement in the diffuser, thereby affecting diffuser integrity and/or deployment of the airbag.

With this in mind, the extension and added fastening location provided by the diffuser of the present invention helps to more securely mount the inflator to the module housing while at the same time providing a secure connection capable of counterbalancing the reaction forces generated by using the additional nozzle. The extension and fastening location therefore allows both inflator nozzles to be used, helping to decrease total inflation and deployment time for the airbag while providing a more robust connection between the inflator and the housing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. To this end, it will also be appreciated that features shown and illustrated in any one example can likewise be added to/interchanged with features in any other example.

We claim:
1. A diffuser for an airbag module having a housing enclosing an inflator and an airbag for helping to protect an occupant of a vehicle, comprising:
  a base extending longitudinally from a first end to a second end and including at least one first opening for receiving at least one first fastener for securing the inflator to the housing;
  sidewalls extending from opposite sides of the base to define a passage for receiving the inflator; and an extension projecting longitudinally beyond the passage and including a second opening for receiving a second fastener for securing the extension to the housing, wherein the diffuser is configured to allow a portion of inflation fluid discharged from the inflator to flow directly from the inflator into the airbag, and to redirect a portion of the inflation fluid discharged from the inflator to flow through the passage into the airbag, and wherein the extension, secured to the housing by the second fastener, is configured to counterbalance unequal net reaction forces placed on the diffuser by the inflation fluid discharged from the inflator.

2. The diffuser recited in claim 1, wherein the sidewalls are curved for mirroring an exterior of the inflator.

3. The diffuser recited in claim 1, further comprising a narrowing throat connecting the sidewalls to the extension.

4. The diffuser recited in claim 1, wherein the second opening is longitudinally offset from the sidewalls.

5. The diffuser recited in claim 1, wherein the first and second openings are longitudinally aligned with one another.

6. The diffuser recited in claim 1, wherein the first and second openings are positioned on opposite ends of the base.

7. An airbag module including the diffuser recited in claim 1.

8. The airbag module recited in claim 7, further comprising:
  the airbag;
  the housing enclosing the airbag; and
  the inflator including first and second nozzles for releasing inflation fluid into the airbag, wherein the at least one first fastener is fixed to the inflator, and the second fastener is spaced from the inflator.

9. The airbag module recited in claim 8, wherein the nozzles are located between the at least one first opening and the second opening.

10. The diffuser recited in claim 1, wherein the sidewalls are configured to define radial gaps between each of the sidewalls and an exterior surface of the inflator, and wherein the diffuser is configured so that at least a portion of inflation fluid is discharged from the inflator directly toward the base, which re-directs the inflation fluid to flow through the radial gaps into the airbag.

11. The diffuser recited in claim 10, wherein each sidewall has a terminal edge that extends generally parallel to a longitudinal axis of the diffuser, the edges being spaced apart leaving the inflator exposed to an interior of the airbag, the diffuser being configured to discharge inflation fluid directed through the radial gaps and between the spaced apart edges into the airbag.

12. The diffuser recited in claim 11, wherein the sidewalls are free from openings configured to discharge inflation fluid into the airbag.

13. The diffuser recited in claim 11, wherein the diffuser is configured to receive the inflator comprising diametrically opposed nozzles through which inflation fluid is discharged, wherein the diffuser is configured so that inflation fluid discharged through a first of the nozzles is discharged directly toward the base, which re-directs the inflation fluid to flow through the radial gaps into the airbag, and wherein the diffuser is configured so that inflation fluid discharged through a second of the nozzles flows directly into the airbag through an open space between the sidewalls.

14. The diffuser recited in claim 13, wherein the inflation fluid discharged through the second of the nozzles directly into the airbag, and the inflation fluid discharged through the first of the nozzles being redirected by the diffuser creates the net reaction forces placed on the diffuser by inflation fluid discharge of the inflator.

15. The diffuser recited in claim 13, wherein the nozzles are located at an axial end of the inflator.

16. The diffuser recited in claim 1, wherein the extension is configured to extend from an end of the base over which nozzles are positioned.

17. The diffuser recited in claim 1, wherein the diffuser is configured so that the net reaction forces are unequally distributed along a longitudinal axis of the diffuser.

18. The diffuser recited in claim 1, wherein the diffuser is configured to receive the inflator having diametrically opposed first and second nozzles, wherein the diffuser is further configured to direct inflation fluid from the first nozzle to flow directly into the airbag, and to redirect inflation fluid from the second nozzle to flow through the passage into the airbag.

* * * * *